(12) United States Patent  
Odinak et al.

(10) Patent No.: US 10,614,813 B2  
(45) Date of Patent: Apr. 7, 2020

(54) SYSTEM AND METHOD FOR PERFORMING CALLER IDENTITY VERIFICATION USING MULTI-STEP VOICE ANALYSIS

(71) Applicant: Intellisist, Inc., Seattle, WA (US)

(72) Inventors: Gilad Odinak, Bellevue, WA (US); Yishay Carmiel, Seattle, WA (US)

(73) Assignee: Intellisist, Inc., Seattle, WA (US)

( * ) Notice: Subject to any disclaimer, the term of this patent is extended or adjusted under 35 U.S.C. 154(b) by 22 days.

(21) Appl. No.: 15/803,288

(22) Filed: Nov. 3, 2017

(65) Prior Publication Data

US 2018/0130473 A1 May 10, 2018

Related U.S. Application Data

(60) Provisional application No. 62/417,967, filed on Nov. 4, 2016.

(51) Int. Cl.
*G10L 17/00* (2013.01)
*G10L 17/02* (2013.01)
(Continued)

(52) U.S. Cl.
CPC .............. *G10L 17/02* (2013.01); *G06F 21/32* (2013.01); *G10L 17/00* (2013.01); *G10L 17/005* (2013.01); *G10L 17/20* (2013.01); *G10L 17/24* (2013.01)

(58) Field of Classification Search
CPC ......... G10L 17/02; G10L 17/22; G10L 17/24; G10L 17/00; G10L 17/005; G10L 15/26;
(Continued)

(56) References Cited

U.S. PATENT DOCUMENTS 5,839,103 A * 11/1998 Mammone .............. G10L 17/10  
704/232  
6,078,807 A * 6/2000 Dunn ...................... H04M 3/38  
455/410

(Continued)

FOREIGN PATENT DOCUMENTS

EP 2293291 3/2011

OTHER PUBLICATIONS

Shreya Narang et al: "Speech Feature Extraction Techniques: A Review", International Journal of Computer Science and Mobile Computing, vol. 4, No. Mar. 3, 20115 (Mar. 2015), XP002779663, Retrieved from the Internet: URL http://www.ijcsmc.com/docs/papers/March2015/V413201545.PDF [retrieved on Mar. 27, 2018] * the whole document * * figure 1 *.

(Continued)

*Primary Examiner* — Abdelali Serrou  
(74) *Attorney, Agent, or Firm* — Stevens & Showalter, L.L.P.

(57) ABSTRACT

Caller identity verification can be improved by employing a multi-step verification that leverages speech features that are obtained from multiple interactions with a caller. An enrollment is performed in which customer speech features and customer information are collected. When a caller calls into the call center, an attempt is made to verify the caller's identity by requesting the caller to speak a predefined phrase, extracting speech features from the spoken phrase, and comparing the phrase. If the purported identity of the caller can be matched with one of the customers based on the comparison, the identity of the caller is verified. If the match cannot be made with a high enough degree of confidence, the customer is asked to speak any phrase that is not predefined. Features are extracted from the caller's speech, (Continued)

combined with features previously extracted from the predefined speech, and compared to the enrollment features.

20 Claims, 6 Drawing Sheets

(51) Int. Cl.
    *G06F 21/32* (2013.01)
    *G10L 17/20* (2013.01)
    *G10L 17/24* (2013.01)

(58) Field of Classification Search
    CPC ......... G10L 17/04; G10L 15/22; G10L 17/06;
                G10L 17/14; G10L 2015/088; G10L
                15/063; G10L 17/08; G10L 2015/223;
                G10L 13/00; G10L 15/02; G10L 15/07;
                G10L 15/14; G10L 15/16; G10L 15/19;
                G10L 15/30; G10L 17/10; G10L 17/16;
                G10L 17/18; G10L 2015/0638; G10L
                2025/783; G10L 25/18; G10L 25/48;
                G10L 25/51; G10L 25/78; G06F 21/32
    See application file for complete search history.

(56) References Cited

U.S. PATENT DOCUMENTS

| | | | | |
|---|---|---|---|---|
| 6,219,639 B1* | 4/2001 | Bakis | ............... | G06K 9/00885 382/116 |
| 6,519,561 B1* | 2/2003 | Farrell | ............... | G10L 15/07 704/232 |
| 7,536,304 B2 | 5/2009 | Di Mambro et al. | | |
| 8,453,207 B1* | 5/2013 | White | ............... | G06F 21/32 726/2 |
| 9,514,753 B2* | 12/2016 | Sharifi | ............... | G10L 17/005 |
| 9,548,979 B1* | 1/2017 | Johnson | ............... | H04L 63/0861 |
| 9,711,148 B1* | 7/2017 | Sharifi | ............... | G10L 17/02 |
| 2003/0009333 A1* | 1/2003 | Sharma | ............... | G10L 15/04 704/246 |
| 2004/0190688 A1* | 9/2004 | Timmins | ............... | H04M 3/4878 379/88.02 |
| 2004/0223593 A1* | 11/2004 | Timmins | ............... | H04M 3/4878 379/88.02 |
| 2005/0096906 A1* | 5/2005 | Barzilay | ............... | G06Q 30/06 704/249 |
| 2006/0111905 A1* | 5/2006 | Navratil | ............... | G10L 15/144 704/256.7 |
| 2006/0149558 A1* | 7/2006 | Kahn | ............... | G10L 15/063 704/278 |
| 2006/0245576 A1* | 11/2006 | Henry | ............... | H04M 3/42068 379/265.01 |
| 2007/0239451 A1* | 10/2007 | Luan | ............... | G10L 17/04 704/246 |
| 2008/0071535 A1* | 3/2008 | Yoshioka | ............... | G10L 17/02 704/246 |
| 2008/0082331 A1* | 4/2008 | Luan | ............... | G10L 17/04 704/246 |
| 2008/0159488 A1 | 7/2008 | Raja | | |
| 2008/0195389 A1* | 8/2008 | Zhang | ............... | G10L 17/14 704/246 |
| 2008/0205624 A1 | 8/2008 | Mandalia et al. | | |
| 2008/0281600 A1* | 11/2008 | Kuppuswamy | ............... | G10L 17/22 704/273 |
| 2008/0312925 A1 | 12/2008 | Jaiswal et al. | | |
| 2010/0131273 A1* | 5/2010 | Aley-Raz | ............... | G10L 17/24 704/247 |
| 2012/0069975 A1* | 3/2012 | Odinak | ............... | H04W 4/12 379/88.14 |
| 2013/0268272 A1* | 10/2013 | Zhang | ............... | G10L 17/00 704/243 |
| 2013/0325473 A1* | 12/2013 | Larcher | ............... | G10L 17/10 704/249 |
| 2014/0020058 A1* | 1/2014 | White | ............... | G06F 21/36 726/2 |
| 2014/0195232 A1* | 7/2014 | Kurniawati | ............... | G10L 17/04 704/245 |
| 2014/0359739 A1* | 12/2014 | Bao | ............... | G06F 21/32 726/7 |
| 2015/0039451 A1* | 2/2015 | Bonfiglio | ............... | G06Q 50/12 705/15 |
| 2016/0225374 A1* | 8/2016 | Rodriguez | ............... | G10L 17/04 |

OTHER PUBLICATIONS

Mayank Bhargavaa, Tim Polzehl: "Improving Automatic Emotion Recognition from speech using Rhythm and Temporal feature", Internet article, Dec. 21, 2012, PX002779664, Retrieved from the Internet: URL:https://arxiv.org/ftp/arxiv/papers/1303/1303.1761. pdf [retrived on Mar. 27, 2018] * the whole document *.

European Search Report and Written Opinion; European Patent Application No. EP17200111; dated Apr. 9, 2018; European Patent Office; Munich, Germany.

Reynolds, Ryan; Canadian Office Action; Canada Patent Application No. 2,984,787; dated Jun. 7, 2019; Canadian Intellectual Property Office; Canada.

Reynolds, Ryan; Canadian Examination Report; Canada Patent Application No. 2,984,787; dated Jul. 25, 2018; Canadian Intellectual Property Office; Canada.

\* cited by examiner

```
Compare text-prompted
speech features to
enrollment speech features
          │
          ▼
    More than
    one enrollment     — 81
    performed?
   /         \
  No          Yes
  │            │
  │            ▼
  │   Identify current call     — 82
  │   characteristics
  │            │
  │            ▼
  │   Compare current call
  │   characteristics to enrollment call  — 83
  │   characteristics
  │            │
  │            ▼
  │   Identify matching enrollment  — 84
  │            │
  └────────────┤
               ▼
   Compare text-prompted speech
   features to enrollment speech   — 85
   features
               │
               ▼
         Sufficient similarity?   — 86
          /         \
         No          Yes
         │            │
         ▼            ▼
  Determine mismatch   Determine match  — 87
         │            │
      88 │            │
         └─────┬──────┘
               ▼
             End
```

SYSTEM AND METHOD FOR PERFORMING CALLER IDENTITY VERIFICATION USING MULTI-STEP VOICE ANALYSIS

CROSS-REFERENCE TO RELATED APPLICATION

This non-provisional patent application claims priority under 35 U.S.C. § 119(e) to U.S. Provisional Patent application Ser. No. 62/417,967, filed Nov. 4, 2016, the disclosure of which is incorporated by reference.

FIELD

The present invention relates in general to call center communications and, in particular, to a system and method for performing caller identity verification using multi-step voice analysis.

BACKGROUND

Customer call centers, or simply, "call centers," are often the first point of contact for customers seeking direct assistance from manufacturers and service vendors. Call centers provide customer support and problem resolution and are reachable by telephone, including data network-based telephone services, such as Voice-Over-Internet (VoIP), or via Web applications that allow customers to make calls, as well as through other communication channels. To be able to assist the customers, the call centers must often verify the identity of these customers. Such verification is necessary to both protect sensitive information of the customers, such as the customer's account balances or medical information, and to prevent unauthorized actions with regards to the customer accounts, such as withdrawal of money from the accounts.

Multiple ways to conduct an identity verification during a call exist, but these existing verification techniques are often inadequate or take too much time to perform. For example, callers are often asked to answer one or more questions, such as to provide their birthday or their mother's maiden name, to verify their identity. However, the requested information may often be found online or in other public sources, and the verification procedure can be successfully completed by a person other than the customer. Furthermore, asking the questions and processing the answers can require significant time, which prolongs the length of the calls and decreases customer satisfaction.

Alternatively, the verification may be conducted by analyzing the caller's voice. Such verification procedures involve a customer whose identity is verified undergoing an enrollment during which a sample of the customer's voice is obtained and analyzed. Subsequently, during an identity verification procedure, a caller is asked to speak a phrase and the caller's voice is compared to the prerecorded voice sample for a customer that the caller claims to be. Several issues can be encountered during such identity verification procedure. First, to be of value, the verification must be completed in a shorter time than by asking the caller questions. If the caller's voice does not perfectly match the enrollment voice sample for reasons such as insufficient sample length, the verification may take longer than necessary. Such issues can be further exacerbated when the voice sample was recorded under different circumstances, such as via a different communication channel, than the speech spoken by the caller. Further, where the verification procedure does not require the caller to speak a particular phrase, the verification procedure can be bypassed by an identity thief recording the voice of a customer and then playing the recording during the verification.

Accordingly, there is a need for a way to increase the speed and accuracy of verification of a caller's identity.

SUMMARY

Caller identity verification can be improved by employing a multi-step verification that leverages speech features that are obtained from multiple interactions with a caller. An enrollment is performed during which customer speech features and customer information are collected. When a caller calls into the call center, an attempt is made to verify to verify the caller's identity by requesting the caller to speak a predefined phrase, extracting speech features from the spoken phrase, and comparing the speech features to enrollment speech features for one of the customers. If the purported identity of the caller can be matched with one of the customers based on the comparison, the identity of the caller is verified. If the match cannot be made with a high enough degree of confidence, the customer is asked to speak any phrase, a phrase that is not tied to any particular text. Features are extracted from the caller's speech, combined with features previously extracted from the predefined speech, and compared to the features obtained during a customer's enrollment. By increasing the number of features used for the comparison, the identity verification can be made more accurate while still being quick enough to be useful.

In one embodiment, a system and method for performing caller identity verification using multi-step voice analysis with the aid of a digital computer are provided. One or more sets of speech features associated with a customer of a call center are obtained by at least processor, including: prompting the customer to speak while the customer is connected to the call center via a voice connection; receiving speech from the customer comprising at least one phrase; determining the features of the received speech; storing the features in a database as one of the sets. A call from a caller is received into the call center. A purported identity of the caller as the customer is established by the processor. The purported identity of the caller as the customer is verified by the processor, including: prompting the caller to speak a text of the at least one phrase; receiving the text-prompted speech from the caller; determining one or more of the features of the text-prompted speech; comparing the text-prompted speech features to one of the stored speech features sets associated with the customer; prompting the caller to speak any additional phrase when the purported identity is not verified as the matching customer based on the comparison; receiving an additional speech comprising the additional phrase from the caller; determining one or more of features of the additional phrase; combining the additional speech features with the predefined speech features; comparing the combined speech features to the one stored speech feature set; and verifying the purported identity of the caller as the customer based on the comparison of the combined features to the one stored speech features set.

Still other embodiments will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 4 is a flow diagram showing a routine for comparing features extracted from text-prompted speech to enrollment features for use in the method of FIG. 2 in accordance with one embodiment.

DETAILED DESCRIPTION

Figure 1:
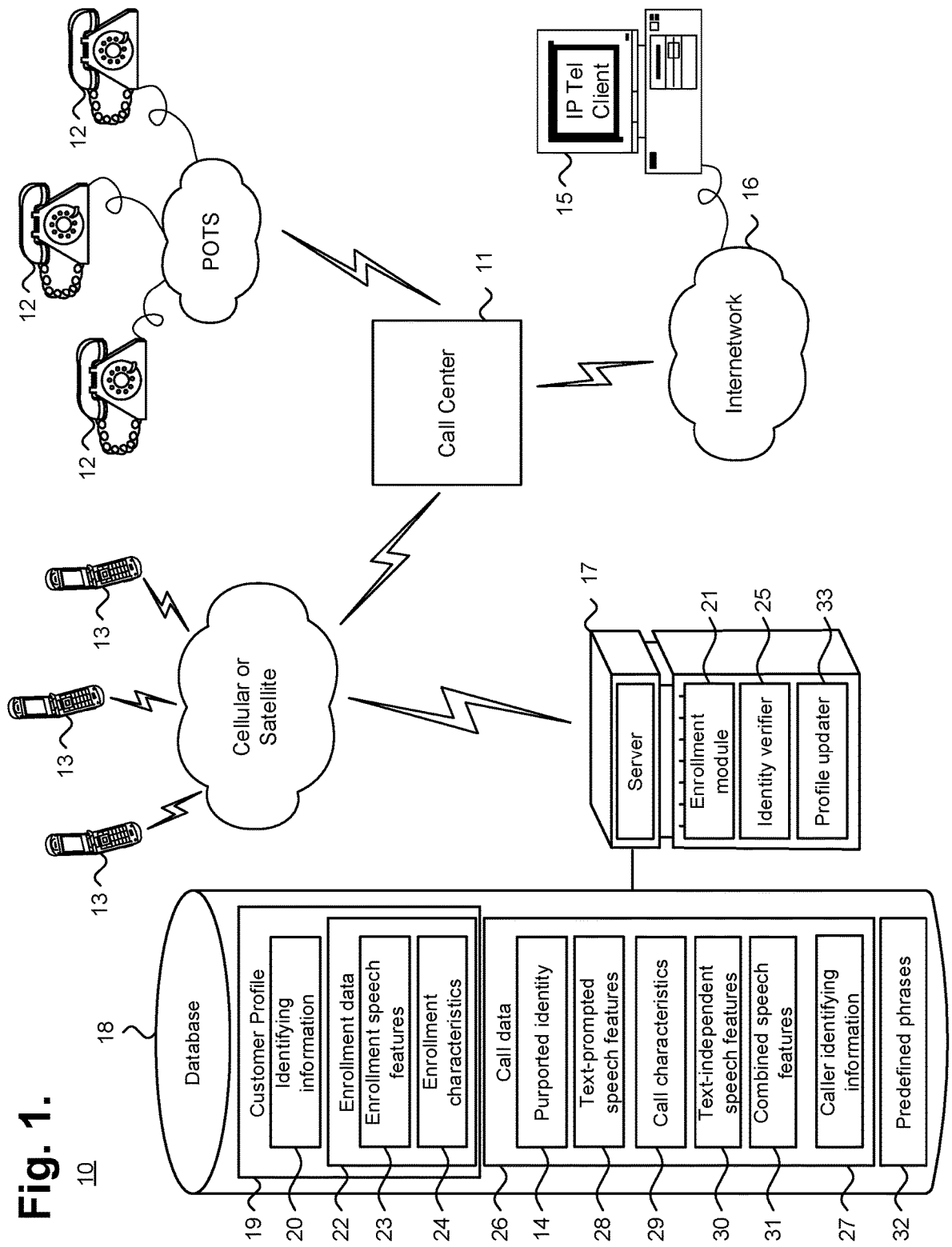
FIG. 1 is a block diagram showing an automated call center environment for performing caller verification using multi-step voice analysis in accordance with one embodiment.

The speed and accuracy of identity verification can be improved via using a multi-step voice analysis. FIG. 1 is a block diagram showing an automated call center environment 10 for performing caller verification using multi-step voice analysis in accordance with one embodiment. By way of example, a multiplicity of customers or other users associated with an automated call center 11 can contact the call center 11 through voice communication channels. The ways to use voice communication include Plain Old Telephone Service (POTS) 12, cellular and satellite telephones 13, and Internet telephony (IPTel) 15, including Voice over IP (VoIP) technology that can be implemented through a connection to an internetwork 16, such as the Internet. Other forms of telephony and voice-based communications can be used, as would be recognized by one skilled in the art.

The automated call center 11 provides a single source of support and problem resolution for customers seeking direct assistance from manufacturers and service vendors, although automated call centers 11 can also be used in other areas of commerce. Although the automated call center 11 is shown as a single point within the automated call center operation environment 10, the automated call center 11 could include one or more logically interconnected but physically separate, including geographically removed, operations, which provide a logically unified automated call center 11.

The call center environment 10 further includes at least one server 17 that is connected to at least one database 18 storing customer profiles 19. In one embodiment, the server 17 and the database 18 can be a part of the call center 11. In a further embodiment, the server 17 and the database could be interfaced to the call center 11 while being physically remote.

The at least one server 17 executes an enrollment module 21 and at least the first time a customer utilizes the call center's services 11, the enrollment module performs an enrollment session during which information about the customer is collected and a profile 19 of the customer is created using the information. A customer profile 19 includes information 20 identifying the customer, such as name and address. The identifying information 20 also includes customer contact information, such as the customer's phone number.

The enrollment module 21 also collects enrollment data 22, which includes speech features 23 associated with the customer and characteristics 24 of the enrollment. The speech features 23, such as the frequency of the customer's voice and the amplitude of the voice, are collected by prompting (such as via a synthesized voice or prerecorded phrases) the customer to speak one or more phrases and analyzing the spoken phrases. The customer can be asked by the enrollment module 21 to say specific predefined phrases 32, with the text of the phrases 32 being stored in the database 18. In a further embodiment, the caller could be asked to say any phrase not tied to predefined text during the enrollment.

The enrollment characteristics 24 determined by the enrollment module 21 can include the kind of connection the customer is using when interacting with the call center 11 during a particular enrollment, such as whether the customer is calling via Plain Old Telephone Service (POTS) 12, cellular and satellite telephones 13, and Internet telephony (IPTel) 15, and whether any particular kind of noise is present during the enrollment. Other kinds of characteristics 24 are possible.

Once an enrollment is complete, the enrollment data 22 can be used to verify a purported identity of a caller to the call center 11. In particular, the server 17 further executes an identity verifier 25 that collects data 26 regarding a call received at the call center 11 and performs a verification of an identity of a caller to the call center 11. The call can be conducted via any voice communication channel, including cellular or satellite 13 telephony, POTS 12, IPTel 15, or other voice-communication channels.

Initially during a call, the verifier 25 establishes a purported identity 14 of the caller by matching identifying information 27 of the caller with the identifying information 20 in the profiles 19 of the customers of the call center 11. For example, the verifier 25 may request the name of the caller and upon receiving the name from the caller, matches the name to the names of the customers stored as identifying information 20 in the customer profiles 19. Likewise, the verifier 25 can identify the phone number from which the caller is calling and match that phone number to the phone number of one of the customers. Other ways to establish the purported identity 14 of the caller are possible.

Figure 2:
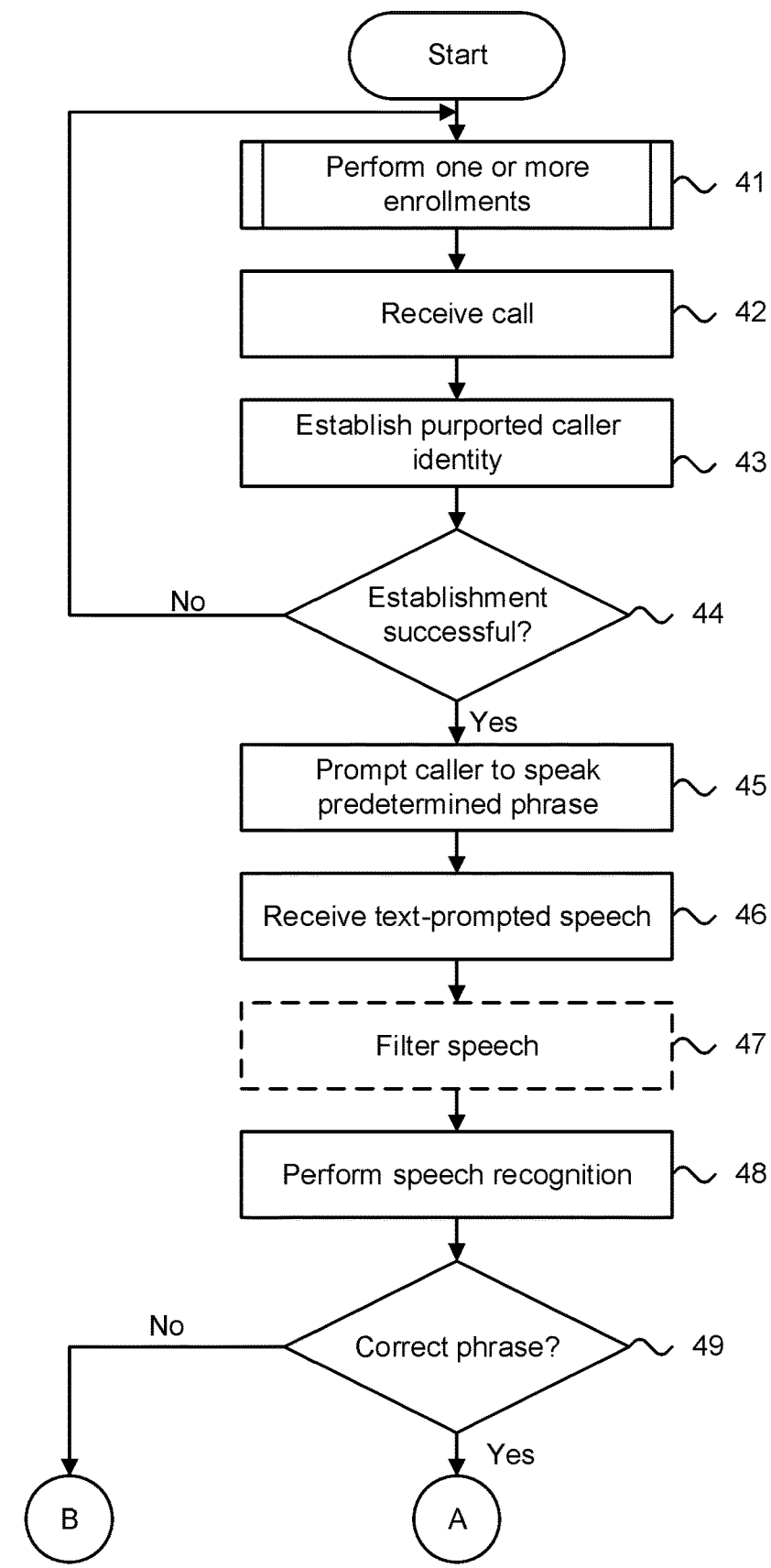
FIG. 2 is a flow diagram showing a method for performing caller identity verification using multi-step voice analysis in accordance with one embodiment.
Figure 2:
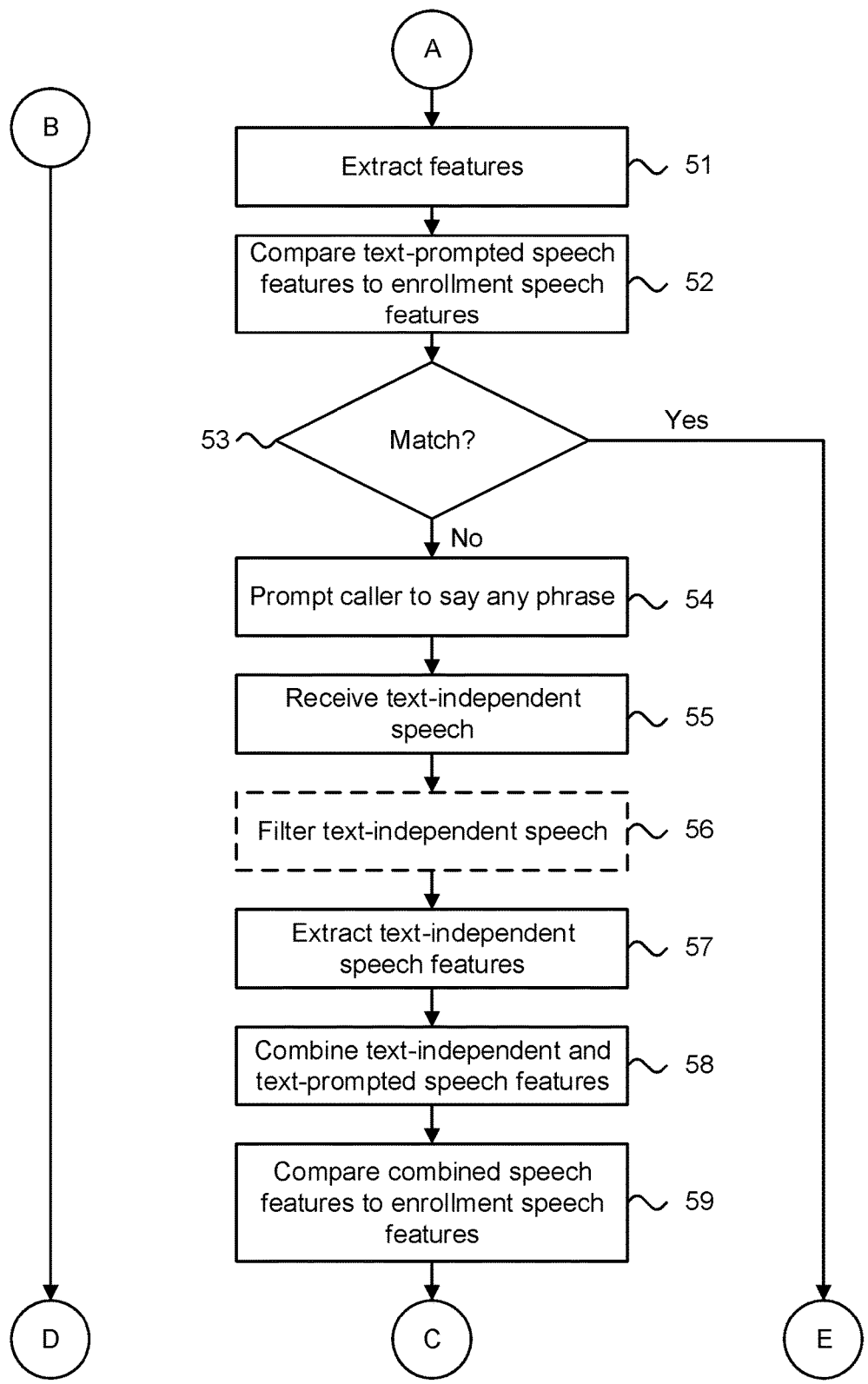
Figure 2:
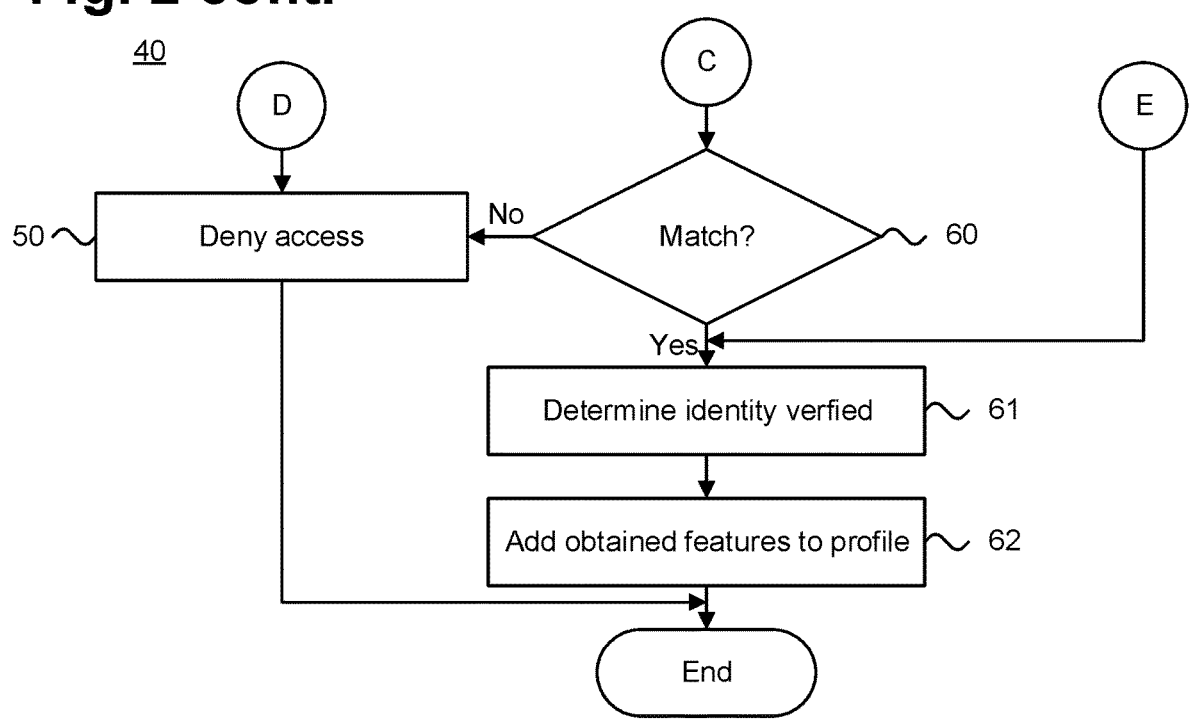

The verifier 25 can use prerecorded phrases or synthesized speech to communicate with the caller and can verify the purported identity of the caller by analyzing the caller's voice heard in response to communications from the verifier 25, as also described in detail beginning with reference to FIG. 2. Briefly, the verifier 25 requests the caller to speak the same phrase that was spoken during the enrollment of the customer matching the purported identity of the caller, receives the phrase spoken by the caller, and performs speech recognition on the phrase to determine that the speech spoken by the caller is indeed the same phrase that was spoken by the customer. If the speech corresponds to the phrase spoken during the enrollment, the verifier 23 extracts features 28 from the spoken phrase (the spoken phrase being referred to as "text-prompted speech" due to being dependent on the text of the phrase spoken by the customer during the enrollment). The extracted features 28 can be the same as the features 23 obtained during enrollment 23, such as voice amplitude and voice frequency. The verifier compares the features 23 and 28 and the match between the feature sets is high enough, meeting a predefined threshold, verifies the identity of the caller as one of the customers.

If there are multiple sets of features 23 for the same customer that were obtained during multiple enrollments with different characteristics 24, the verifier 25 determines the characteristics 29 of the call, such as the kind of connection the call is conducted via or presence of a particular noise during the call, though other call characteristics 29 are also possible. The verifier 25 compares the characteristics 29 of the call to the characteristics 24 of the multiple enrollments. The features 23 obtained during the enrollment with characteristics 24 with a greatest match to the characteristics 29 of the call are used during the verification of the caller's purported identity.

If the features 28 obtained from the text-prompted speech do not match with a high enough confidence the features 23 obtained during enrollment, the verifier 25 proceeds to request the caller to speak any additional phrase ("text-independent speech). The features 30 of the text-independent speech spoken by the caller are determined, and the features 30 from the text-prompted speech are combined with the features 28 extracted from the text-prompted speech to obtain combined speech features 31. The verifier 25 compares the combined speech features 31 to the features 23 obtained during enrollment and can verify the caller's identity based on the comparison.

Following completion of the verification of the identity, the combined features 31 can be added to the profile 19 of the customer whose identity matches the caller by a profile updater 33 executed by the at least one server 17. If the characteristics 24 of one of the enrollments for the customer match the characteristics 29 of the call with a predetermined degree of similarity (such as being a perfect match, though other degrees of similarity are possible), the combined speech features could be added to an existing enrollment speech feature 23 set. Alternatively, if no enrollment with sufficiently similar characteristics is found, the combined features 31 and the characteristics of the call 29 could be added as a new set of enrollment data 22 set for use in subsequent identity verifications.

The server 17 can include components conventionally found in general purpose programmable computing devices, such as a central processing unit, memory, input/output ports, network interfaces, and non-volatile storage, although other components are possible. The server 17 is configured to execute modules, which can include the enrollment module 21, the identity verifier 25, and the profile updater 33. Other modules are possible.

The modules can be implemented as a computer program or a procedure written as source code in a conventional programming language and presented for execution by the central processing unit as object or byte code or written as interpreted source code in a conventional interpreted programming language interpreted by a language interpreter executed by the central processing unit as object, byte, or interpreted code. Alternatively, the modules could also be implemented in hardware, either as integrated circuitry or burned into read-only memory components, and the server 17 can act as a specialized computer. For instance, when the modules are implemented as hardware, that particular hardware is specialized to perform the enrollment and identity verification and other computers cannot be used. Additionally, when the modules are burned into read-only memory components, the server 17 storing the read-only memory becomes specialized to perform the monitoring, detection, and delivery that other computers cannot. Other types of specialized computers on which the modules could be implemented are also possible. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components. The at least one server 17 can be in a cloud-computing environment or be a dedicated server. The at least one server 25 can be located within the call center 11 or be interfaced to the call center via a network such as the Internetwork 16.

Performing a multi-step identity verification allows to increase the amount of voice features of a caller's voice available for analysis. FIG. 2 is a flow diagram showing a method 40 for performing caller identity verification using multi-step voice analysis in accordance with one embodiment. The method 40 can be performed using the system 10 described above with reference to FIG. 1, though other implementations may be possible. Initially, one or more enrollments for one or more customers of a call center are performed (step 41), as further described below with reference to FIG. 3. A call is received to the call center (step 42); the call can be received through any voice communication channel described above, though other ways to establish a voice communication with a customer are possible. A purported identity of the caller as one of the customers of the call center is established (step 43). The establishment of the purported identity can be performed by detecting identifying information regarding the call, such as the phone number from which the call is being performed, or requesting the name of the caller from the caller, and matching the information regarding the caller to the information stored regarding the customers. If the establishment of the purported identity is successful (step 44), the method proceeds to step 45 described below. If the establishment of the purported identity is unsuccessful (step 44), the method returns to step 41 and the caller is invited to undergo an enrollment.

The caller is prompted to speak a predetermined phrase, the same phrase that the customer matching the purported identity has said during the enrollment (step 45). Speech is received from the caller (step 46). Optionally, if the received speech is accompanied by non-speech noise, such as music, the non-speech noise can be filtered from away from the speech prior to the speech undergoing subsequent processing (step 47). Speech recognition is performed on the received speech to determine if the caller indeed said the correct predetermined phrase (step 48). If an incorrect phrase was said (step 49), which could be an indication of an identity thief trying to access the customer's information using a recording of the customer's voice, the identity verification is determined failed and access to the customer's account is denied (step 50), terminating the method 40. In a further embodiment, before determining a failure of the identity verification, the caller could be given one or more additional chances to prove his or her identity, with the method returning to step 45 and asking the caller to speak a different predetermined phase.

If the caller spoke the correct phrase (step 49), features are extracted from the text-prompted speech received from the caller in step 46 (step 51) and the extracted features are compared to the speech features from an enrollment for the customer matching the purported identity of the caller (step 52), as further described below with reference to FIG. 4 below. If the enrollment speech features and the text-prompted speech features match with a predefined degree of similarity based on the comparison (step 53), the method 40 moves to step 60 described below. If there is no match with the sufficient degree of similarity (step 53), the caller is prompted to say any additional phrase (step 54), a phrase that does not depend on any particular predefined text. The text-independent speech is received from the caller (step 55), optionally filtered from any non-speech noise (step 56), and features are extracted from the received text-independent speech (step 57). The features from the text-independent speech are combined with the features extracted from the text-prompted speech (step 58), and the combined features are compared to the features for the enrollment of the customer matching the purported identity of the caller(step 59).

If multiple enrollments were performed for the customer matching the purported identity of the caller, the same enrollment features that were used for comparison to features extracted from the text-dependent speech are also used for the comparison to the combined features. If the combined speech features and the enrollment speech features match (step 60), such as by meeting a predefined threshold of similarity, the purported identity of the caller as one of the customers is determined verified (step 61) and the combined features are added to the profile of the customer for use in future identity verifications (step 62), terminating the method 40. If the characteristics of one of the enrollments for the customer match the characteristics of the call with a predetermined degree of similarity (such as being a perfect match, though other degrees of similarity are possible), the combined speech features could be added to an existing enrollment speech feature set. Alternatively, if no enrollment with sufficiently similar characteristics are found, the combined feature set and the characteristics of the call could be added as a new set of enrollment data.

If the combined speech features and the enrollment speech features do not match, the identity verification is determined failed and access to the customer's account is denied (step 50), terminating the method 40.

Figure 3:
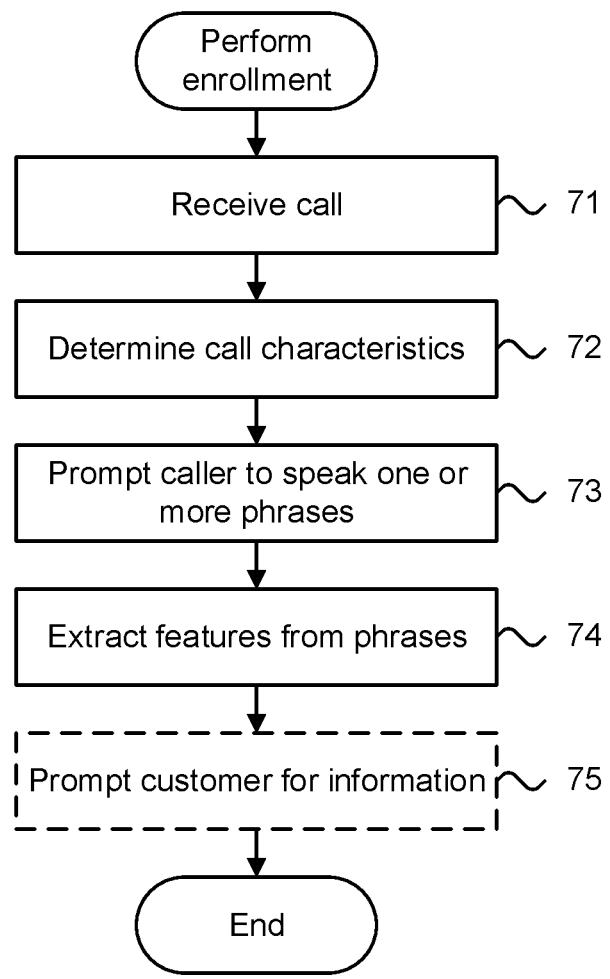
FIG. 3 is a flow diagram showing a routine for performing a customer enrollment for use in the method of FIG. 2 in accordance with one embodiment.

Performing enrollment of a customer allows to collect data necessary for verification of a customer's identity during subsequent interactions with the call center. FIG. 3 is a flow diagram showing a routine 70 for performing a customer enrollment for use in the method 40 of FIG. 2, in accordance with one embodiment. A call is received (step 71) and the characteristics of the call are determined (step 72), such as whether the call is done via a landline, a cellular phone, Internet telephony, or through another technique, and a particular number from which the call is made, though other characteristics are possible (step 72). The caller is prompted to speak one or more phrases; the phrases spoken during enrollment can be predefined or not predefined phrases (step 73). The phrases spoken by the customer are recorded and the features are extracted from the call and stored as part of the profile of the customer (step 74). Optionally, if not previously available, the customer is prompted to provide information about himself or herself that is stored as part of the customer profile in the database (step 75), ending the routine 70.

Identity of a caller as one of the customers can be verified by comparing the features extracted from the speech of the caller to features saved from an enrollment of the customer. FIG. 4 is a flow diagram showing a routine 80 for comparing features extracted from text-prompted speech to enrollment features for use in the method 40 of FIG. 2 in accordance with one embodiment. If only one enrollment was performed for the customer matching the purported identity of the caller (step 81), the routine 80 moves to step 85 below. If more than one enrollment for a customer who matches the caller's purported identity are stored in the database (step 81), one or more characteristics of the current call, such as whether the call is via landline, cellular network, or Internet telephony, the particular number from which the call is performed, or presence of a particular noise, are determined (step 82). The characteristics of the call are compared to the enrollment characteristics (step 83), and the enrollment that is the closest match to the call based on the characteristics (such as having a matching connection technique or being made from the same number), is identified (step 84). The features obtained during the matching enrollment (or the only enrollment if only one enrollment was made are compared to the features extracted from the received text-dependent speech (step 85). If a predetermined degree of similarity in the compared features is present (step 86), a match in the features is determined (step 87). If the predetermined degree of similarity is not present (step 86), the identity is determined not verified (step 88), ending the routine 70.

While the call center in system 10 and method 40 is described as receiving a call from a caller, in a further embodiment, the call center could initiate contact with a person whose purported identity is one of the customers. For example, the call center could place a call to a phone number associated with a customer, and use the multi-step verification described above to verify the identity of the person who answered the call.

While the invention has been particularly shown and described as referenced to the embodiments thereof, those skilled in the art will understand that the foregoing and other changes in form and detail may be made therein without departing from the spirit and scope of the invention.

What is claimed is:

1. A system for performing caller identity verification using multi-step voice analysis with the aid of a digital computer, the digital computer comprising at least one computer processor configured to execute code to:
   obtain one or more sets of stored speech features associated with a customer of a call center, wherein the one or more sets of stored speech features comprise speech features determined from at least one phrase provided by the customer during a voice connection with the call center;
   receive a call from a caller into the call center;
   identify a purported identity of the caller as the customer; and
   verify the purported identity of the caller as the customer by:
      prompting the caller to speak a text of the at least one phrase;
      determining one or more speech features of the text-prompted speech;
      prompting the caller to speak any additional phrase;
      determining one or more speech features of the additional phrase;
      combining the one or more speech features of the additional phrase with the one or more speech features of the text-prompted speech to form combined speech features;
      comparing the combined speech features to one of the one or more sets of stored speech features; and
      verifying the purported identity of the caller as the customer based on the comparison of the combined speech features to the one set of stored speech features.

2. The system according to claim 1, wherein obtaining one or more sets of stored speech features comprises prompting the customer to speak while the customer is connected to the call center via the voice connection and wherein the processor when executing the code further:

identifies one or more characteristics of the voice connection associated with each of the one or more sets of stored speech features;

identifies one or more characteristics of the call;

compares the characteristics of the call and the characteristics for each of the one or more sets of stored speech features; and identifies, based on the comparison of the characteristics of the call and the characteristics for each of the one or more sets of stored speech features, the one set of stored speech features used for the comparison with the combined speech features.

3. The system according to claim 2, wherein the characteristics for the voice connection comprise a type of the voice connection and the characteristics for the call comprise a type of a connection between the caller and the call center during the call.

4. The system according to claim 2, wherein the characteristics for the voice connection comprise a type of noise present during the voice connection and the characteristics for the call comprise a type of noise present during the call.

5. The system according to claim 1, wherein the processor when executing the code:

performs speech recognition on the text-prompted speech; and verifies that the text-prompted speech comprises the at least one phrase based on the speech recognition, wherein the purported identity is determined not to be the customer when the text-prompted speech is determined not to comprise the at least one phrase.

6. The system according to claim 1, wherein the processor when executing the code:

receives a combination comprising a non-speech noise and at least one of the speech features of the text-prompted speech or the speech features of the additional phrase; and filters the non-speech noise from the at least one of the speech features of the text-prompted speech or the speech features of the additional phrase in the combination.

7. The system according to claim 1, wherein at least one of the speech features of the one or more sets of stored speech features, the speech features of the text-prompted speech, or the speech features of the additional phrase comprise at least one of a voice amplitude or a voice frequency.

8. The system according to claim 1, wherein the processor when executing the code:

creates a user profile comprising the one or more sets of stored speech features and customer identifying information;

receives caller identifying information; and compares the caller identifying information to the customer identifying information, wherein the purported identity of the caller is further verified based on the comparison of the caller and customer identifying information.

9. The system according to claim 1, wherein the processor when executing the code performs at least one of:

adding the combined speech features to the one or more sets of stored speech features; or storing the combined speech features as an additional set of stored speech features.

10. The system according to claim 1, wherein the customer and the caller are connected to the call center via at least one of a landline connection, a cellular network connection, or Internet telephony.

11. A method for performing caller identity verification using multi-step voice analysis with the aid of a digital computer, comprising:

obtaining, by at least one processor of the digital computer, one or more sets of stored speech features associated with a customer of a call center, wherein the one or more sets of stored speech features comprise speech features determined from at least one phrase;

receiving, by the at least one processor, a call from a caller into the call center;

identifying, by the at least one processor, a purported identity of the caller as the customer;

verifying, by the at least one processor, the purported identity of the caller as the customer by:

prompting the caller to speak a text of the at least one phrase;

determining one or more speech features of the text-prompted speech;

prompting the caller to speak any additional phrase;

determining one or more speech features of the additional phrase;

combining the one or more speech features of the additional phrase with the one or more speech features of the text-prompted speech to form combined speech features;

comparing the combined speech features to one of the one or more sets of stored speech features; and verifying the purported identity of the caller as the customer based on the comparison of the combined speech features to the one set of stored speech features.

12. The method according to claim 11, wherein obtaining one or more sets of stored speech features comprises prompting the customer to speak while the customer is connected to the call center via a voice connection, the method further comprising:

identifying, by the at least one processor, one or more characteristics of the voice connection associated with each of the one or more sets of stored speech features;

identifying, by the at least one processor, one or more characteristics of the call;

comparing, by the at least one processor, the characteristics of the call and the characteristics for each of the one or more sets of stored speech features; and identifying, by the at least one processor, based on the comparison of the characteristics of the call and the characteristics for each of the one or more sets of stored speech features, the one set of stored speech features used for the comparison with the combined speech features.

13. The method according to claim 12, wherein the characteristics for the voice connection comprise a type of the voice connection and the characteristics for the call comprise a type of a connection between the caller and the call center during the call.

14. The method according to claim 12, wherein the characteristics for the voice connection comprise a type of noise present during the voice connection and the characteristics for the call comprise a type of noise present during the call.

15. The method according to claim 11, further comprising:

performing, by the at least one processor, speech recognition on the text-prompted speech; and verifying, by the at least one processor, that the text-prompted speech comprises the at least one phrase based on the speech recognition, wherein the purported identity is determined not to be the customer when the text-prompted speech is determined not to comprise the at least one phrase.

16. The method according to claim 11, further comprising:
   receiving, by the at least one processor, a combination comprising a non-speech noise and at least one of the speech features of the text-prompted speech or the speech features of the additional phrase; and
   filtering, by the at least one processor, the non-speech noise from the at least one of the speech features of the text-prompted speech or the speech features of the additional phrase in the combination.

17. The method according to claim 11, wherein at least one of the speech features of the one or more sets of stored speech features, the speech features of the text-prompted speech, or the speech features of the additional phrase comprise at least one of a voice amplitude or a voice frequency.

18. The method according to claim 11, further comprising:
   creating, by the at least one processor, a user profile comprising the one or more sets of stored speech features and customer identifying information;
   receiving, by the at least one processor, caller identifying information; and
   comparing, by the at least one processor, the caller identifying information to the customer identifying information,
   wherein the purported identity of the caller is further verified based on the comparison of the caller and customer identifying information.

19. The method according to claim 11, further comprising at least one of:
   adding, by the at least one processor, the combined speech features to the one or more sets of stored speech features; or
   storing, by the at least one processor, the combined speech features as an additional set of stored speech features.

20. The method according to claim 11, wherein the customer and the caller are connected to the call center via at least one of a landline connection, a cellular network connection, or Internet telephony.

* * * * *